United States Patent
Lai et al.

(10) Patent No.: US 9,213,366 B2
(45) Date of Patent: Dec. 15, 2015

(54) HINGE MECHANISM WITH MULTIPLE ROTATING AXES AND ELECTRONIC DEVICE THEREWITH

(71) Applicant: Wistron Corporation, New Taipei (TW)

(72) Inventors: Chi-Hung Lai, New Taipei (TW); Jen-Feng Lin, New Taipei (TW); San-Yang Lo, New Taipei (TW); Shin-Han Wu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 167 days.

(21) Appl. No.: 14/025,846

(22) Filed: Sep. 13, 2013

(65) Prior Publication Data

US 2015/0047446 A1    Feb. 19, 2015

(30) Foreign Application Priority Data

Aug. 15, 2013  (TW) .............................. 102129305 A

(51) Int. Cl.
  *E05D 3/06*    (2006.01)
  *G06F 1/16*    (2006.01)
  *E05D 3/12*    (2006.01)

(52) U.S. Cl.
  CPC ................ *G06F 1/1616* (2013.01); *E05D 3/12* (2013.01); *G06F 1/162* (2013.01); *G06F 1/1681* (2013.01); *Y10T 74/18856* (2015.01)

(58) Field of Classification Search
  CPC ... G06F 1/1681; G06F 1/1616; G06F 1/1618; H05K 5/0226; H04M 1/0214; H04M 1/0216; H04M 1/022; E05Y 2900/606; E05D 3/12; E05D 3/06; E05D 11/06
  See application file for complete search history.

(56) References Cited

U.S. PATENT DOCUMENTS

| | | | | | |
|---|---|---|---|---|---|
| 2,200,699 | A | * | 5/1940 | McNulty | 16/368 |
| 2,372,431 | A | * | 3/1945 | Kahle | 16/371 |
| 3,949,445 | A | * | 4/1976 | Stevens | 16/262 |
| 4,486,919 | A | * | 12/1984 | Schoenke | 16/366 |
| 4,665,585 | A | * | 5/1987 | Westin | 16/302 |
| 4,765,027 | A | * | 8/1988 | Andric | 16/354 |
| 4,823,858 | A | * | 4/1989 | Perutz | 160/135 |
| 5,168,426 | A | * | 12/1992 | Hoving et al. | 361/679.09 |
| 5,282,293 | A | * | 2/1994 | Pedoeem | 16/342 |
| 5,493,760 | A | * | 2/1996 | Takimoto | 16/366 |
| 5,940,937 | A | * | 8/1999 | Churchill et al. | 16/382 |
| 5,943,739 | A | * | 8/1999 | Vandergriff | 16/366 |
| 6,154,359 | A | * | 11/2000 | Kamikakai et al. | 361/679.27 |
| 6,173,476 | B1 | * | 1/2001 | Daoud | 16/323 |
| 6,293,353 | B1 | * | 9/2001 | Poole | 172/776 |
| 6,727,961 | B2 | * | 4/2004 | Yang | 349/58 |

(Continued)

OTHER PUBLICATIONS

Office action mailed on Jul. 23, 2015 for the Taiwan application No. 102129305, filing date: Aug. 15, 2013, p. 1 line 11-14, p. 2-4 and p. 5 line 1-15.

*Primary Examiner* — Chuck Mah
(74) *Attorney, Agent, or Firm* — Winston Hsu; Scott Margo

(57) ABSTRACT

A hinge mechanism with multiple rotating axes is disclosed. The hinge mechanism includes a first bracket, a linking bracket, a first rotating shaft, a second bracket and a second rotating shaft. The first rotating shaft is used for pivoting the first bracket and the linking bracket, such that the linking bracket is connected to the first bracket in a rotable manner. The second rotating shaft is used for pivoting the linking bracket and the second bracket, such that the linking bracket is further connected to the second bracket in a rotable manner.

18 Claims, 13 Drawing Sheets

(56) References Cited

U.S. PATENT DOCUMENTS

| | | |
|---|---|---|
| 6,994,393 B2 * | 2/2006 | Votruba et al. ........... 296/100.06 |
| 2004/0055112 A1 * | 3/2004 | Kiefer et al. .................... 16/302 |
| 2006/0077622 A1 | 4/2006 | Keely |
| 2006/0108483 A1 * | 5/2006 | Wolff et al. ................ 248/122.1 |
| 2008/0230500 A1 * | 9/2008 | Johnson ................. 211/119.004 |
| 2010/0083468 A1 * | 4/2010 | Lin ................................. 16/387 |

* cited by examiner

HINGE MECHANISM WITH MULTIPLE ROTATING AXES AND ELECTRONIC DEVICE THEREWITH

BACKGROUND OF THE INVENTION

1. Field of the Invention

The present invention relates to a hinge mechanism and an electronic device therewith, and more particularly, to a hinge mechanism with multiple rotating axes and an electronic device therewith.

2. Description of the Prior Art

With development of touch control technology and operating system, a notebook computer with a display module equipped with a touch panel has become a mainstream in the industry. When the aforesaid notebook computer is in use, it provides a user not only with a conventional notebook computer mode but also with a tablet computer mode that the display module is turned over and laid on a host module of the notebook computer, such that the touch panel faces the user for performing touch control operations thereon.

Conventionally, there is a recess formed on a casing of the display module of the aforesaid notebook computer. When the notebook computer is in the tablet computer mode, a linkage member of a hinge mechanism of the notebook computer is contained in the recess. It facilitates the user to stably operate the notebook computer in the tablet computer mode that a back side of the display module is completely held by the host module. However, the recess results in an appearance issue of notebook computer and thus disadvantages the notebook computer in the market.

SUMMARY OF THE INVENTION

Thus, the present invention provides a hinge mechanism with multiple rotating axes and an electronic device therewith for solving above drawbacks.

According to an embodiment of the present invention, a hinge mechanism includes a first bracket, a linking bracket, a first rotating shaft, a second bracket and a second rotating shaft. The first bracket includes a first rotating portion, and the linking bracket includes a first pivotal portion and a second pivotal portion. The first rotating shaft includes a first bracket shaft portion and a first linking shaft portion opposite to the first bracket shaft portion. The first bracket shaft portion is pivoted to the first rotating portion and the first linking shaft portion is pivoted to the first pivotal portion, such that the linking bracket is connected to the first bracket in a rotable manner. The second bracket includes a second rotating portion, and the second rotating shaft includes a second bracket shaft portion and a second linking shaft portion opposite to the second bracket shaft portion. The second bracket shaft portion is pivoted to the second rotating portion and the second linking shaft portion is pivoted to the second pivotal portion, such that the linking bracket is further connected to the second bracket in a rotable manner.

According to another embodiment of the present invention, the first bracket further includes a first fixing portion for being fixed on a first casing. The second bracket further includes a second fixing portion for being fixed on a second casing. The second casing activates the second bracket as rotating relative to the first casing, such that the second bracket drives the linking bracket to rotate about the first rotating shaft and relative to the first bracket.

According to another embodiment of the present invention, a stopping portion of the first casing stops the linking bracket when the second casing rotates relative to the first casing over an angle for forcing the linking bracket to bend, such that the second rotating shaft is displaced and moved.

According to another embodiment of the present invention, the second casing activates the second bracket to rotate about the second rotating shaft and relative to the linking bracket when the second casing rotates relative to the first casing over the angle and the second rotating shaft is displaced and moved.

According to another embodiment of the present invention, the hinge mechanism further includes a stopping component movably disposed through the linking bracket and fixed on the first casing. The stopping component is for stopping the linking bracket in an expanded position.

According to another embodiment of the present invention, the hinge mechanism further includes a first bushing member sheathing on the first rotating shaft. Two sides of the first bushing member respectively abut against the first rotating portion of the first bracket and the first pivotal portion of the linking bracket.

According to another embodiment of the present invention, the hinge mechanism further includes a second bushing member sheathing on the second rotating shaft. Two sides of the second bushing member respectively abut against the second rotating portion of the second bracket and the second pivotal portion of the linking bracket.

According to another embodiment of the present invention, the stopping component is a screw component and includes a thread portion and a head portion. The thread portion is movably disposed through the linking bracket and for screwing on the first casing. The head portion is connected to the thread portion and for stopping the linking bracket in the expanding position.

According to another embodiment of the present invention, an electronic device includes a linkage member, a first module, a second module and a hinge mechanism. The linkage member includes a first casing. The first module is pivoted to a first side of the first casing. The second module includes a second casing. The hinge mechanism is installed on a second side of the first casing relative to the first side and for pivoting the linkage member and the second module. The hinge mechanism includes a first bracket, a linking bracket, a first rotating shaft, a second bracket and a second rotating shaft. The first bracket is fixed on the first casing and includes a first rotating portion. The linking bracket includes a first pivotal portion and a second pivotal portion. The first rotating shaft includes a first bracket shaft portion and a first linking shaft portion opposite to the first bracket shaft portion. The first bracket shaft portion is pivoted to the first rotating portion and the first linking shaft portion is pivoted to the first pivotal portion, such that the linking bracket is connected to the first bracket in a rotable manner. The second bracket is fixed on the second casing and includes a second rotating portion. The second rotating shaft includes a second bracket shaft portion and a second linking shaft portion opposite to the second bracket shaft portion. The second bracket shaft portion is pivoted to the second rotating portion and the second linking shaft portion is pivoted to the second pivotal portion, such that the linking bracket is further connected to the second bracket in a rotable manner.

In summary, the hinge mechanism of the present invention utilizes the linking bracket to displace the second rotating shaft relative to the first rotating shaft, so as to move the second rotating shaft out of the first casing of the linkage member. Furthermore, the second module is capable of rotating about the second rotating shaft of the hinge mechanism to the position that the second casing of the second module overlaps with and lies on the first casing of the linkage member. In the above process that the second module rotates relative to and overlaps with the linkage member, the first casing of the linkage member does not interfere with the second casing of the second module since the two rotating shafts of the hinge mechanism of the present invention have two-step rotation design. As a result, it does not need to form a recess on the second casing of the second module. Thus, it improves an appearance issue of electronic device resulting from the recess and advantages the electronic device in the market.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
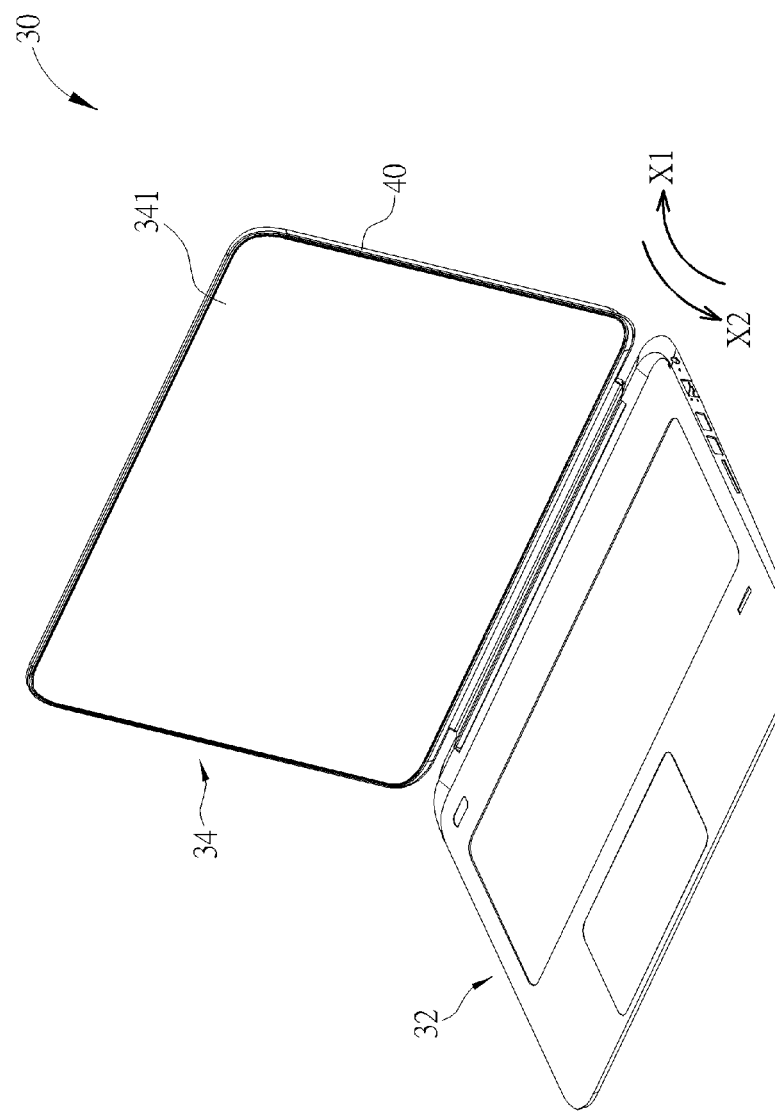
FIG. 1 is a diagram of an electronic device in an expanded status according to an embodiment of the present invention.
Figure 2:
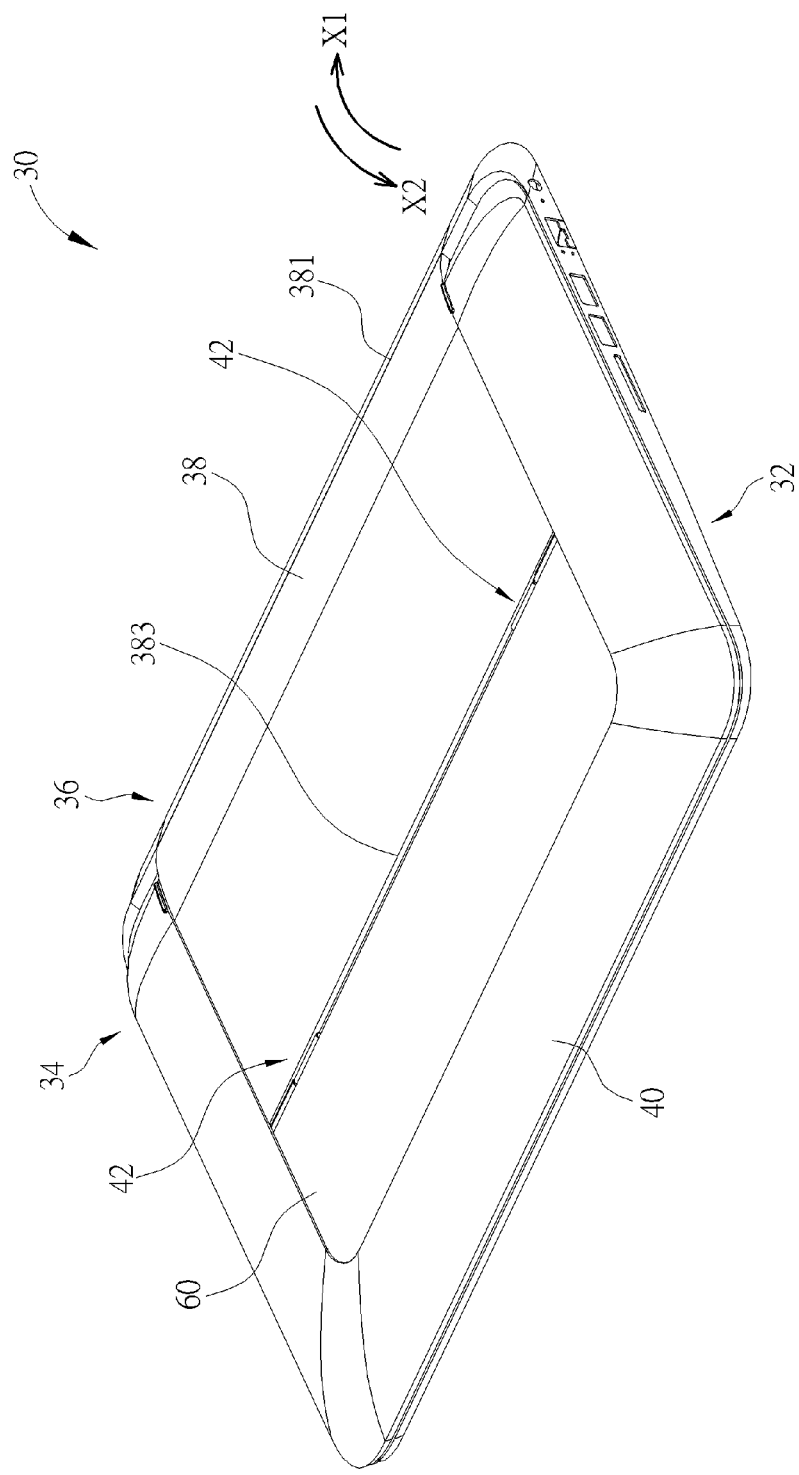
FIG. 2 is a diagram of the electronic device in a contained status according to the embodiment of the present invention.
Figure 3:
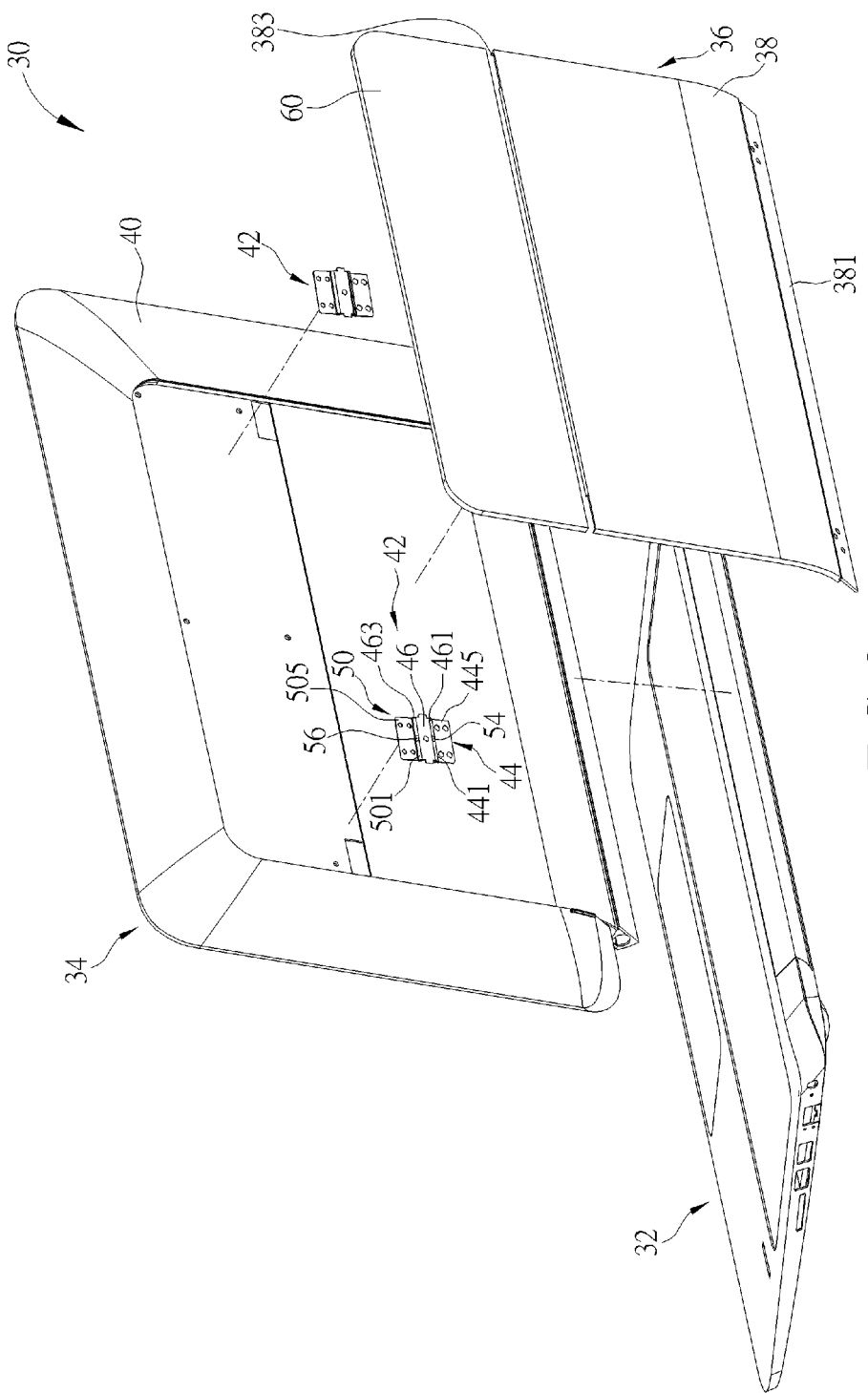
FIG. 3 is an exploded diagram of the electronic device in another view according to the embodiment of the present invention.

Please refer to FIG. 1 to FIG. 3. FIG. 1 is a diagram of an electronic device 30 in an expanded status according to an embodiment of the present invention. FIG. 2 is a diagram of the electronic device 30 in a contained status according to the embodiment of the present invention. FIG. 3 is an exploded diagram of the electronic device 30 in another view according to the embodiment of the present invention. As shown in FIG. 1 to FIG. 3, the electronic device 30 includes a first module 32, a second module 34 and a linkage member 36. The linkage member 36 includes a first casing 38, and the second module 34 includes a second casing 40. The first module 32 is pivoted to a first side 381 of the first casing 38 of the linkage member 36.

Furthermore, the electronic device 30 further includes two hinge mechanisms 42 installed on a second side 383 of the first casing 38 of the linkage member 36 relative to the first side 381. The two hinge mechanisms 42 are used for pivoting the second side 383 of the first casing 38 of the linkage member 36 and the second casing 40 of the second module 34, respectively. In this embodiment, the two hinge mechanisms 42 are disposed on two opposite ends of the second side 383 of the first casing 38, respectively. An amount and disposal positions of the hinge mechanism 42 are not limited to those illustrated in figures in this embodiment. For example, the electronic device 30 can include only one hinge mechanism 42 disposed in the middle of the second side 383 of the first casing 38. In other words, structures of the electronic device 30 including at least one hinge mechanism 42 are within the scope of the present invention. As for which one of the above-mentioned designs is adopted, it depends on practical demands.

When the electronic device 30 is desired to be operated, the second module 34 is rotated from a contained position shown in FIG. 2 in a first direction X1. Since the second casing 40 of the second module 34 is pivoted to the second side 383 of the first casing 38 of the linkage member 36 by the hinge mechanism 42 and the first side 381 of the first casing 38 of the linkage member 36 is pivoted to the first module 32, the second module 34 and the linkage member 36 can be cooperatively rotated from the contained position shown in FIG. 2 to an expanded position shown in FIG. 1 in the first direction X1 for operation. On the other hand, when the electronic device 30 is no longer in use, the second module 34 is rotated from the expanded position shown in FIG. 1 in a second direction X2 opposite to the first direction X1. Meanwhile, the second module 34 and the linkage member 36 can be cooperatively rotated from the expanded position shown in FIG. 1 to the contained position shown in FIG. 2 in the second direction X2 for storage or carrying.

In this embodiment, the electronic device 30 is a notebook computer, the first module 32 is a host module of the notebook computer, and the second module 34 is a display module of the notebook computer. As mentioned above, when the second module 34 (i.e. the display module) rotates to the expanded position relative to the first module 32 (i.e. the host module), the first module 32 (i.e. the host module) can be operated to perform the desired motions, such as inputting words, programming and so on, while the second module 34 (i.e. the display module) can display an operating picture for showing the motions performed by the first module 32 (i.e. the host module). In other words, when the electronic device 30 is in the expanded status shown in FIG. 1, the electronic device 30 is capable of providing the user with the notebook computer mode.

In this embodiment, the display module (i.e. the second module 34) can be further equipped with a touch module, that is, a display panel 341 of the display module (i.e. the second module 34) can be a touch panel. As a result, the touch panel (i.e. the display panel 341) of the display module (i.e. the second module 34) can be utilized for performing a touch control operation, such as sliding cursor, zooming in/out and so on. In other words, the electronic device 30 (i.e. the notebook computer) is capable of providing the tablet computer mode that the user can perform touch control operation on the touch panel (i.e. the display panel 341) of the display module (i.e. the second module 34).

Figure 4:
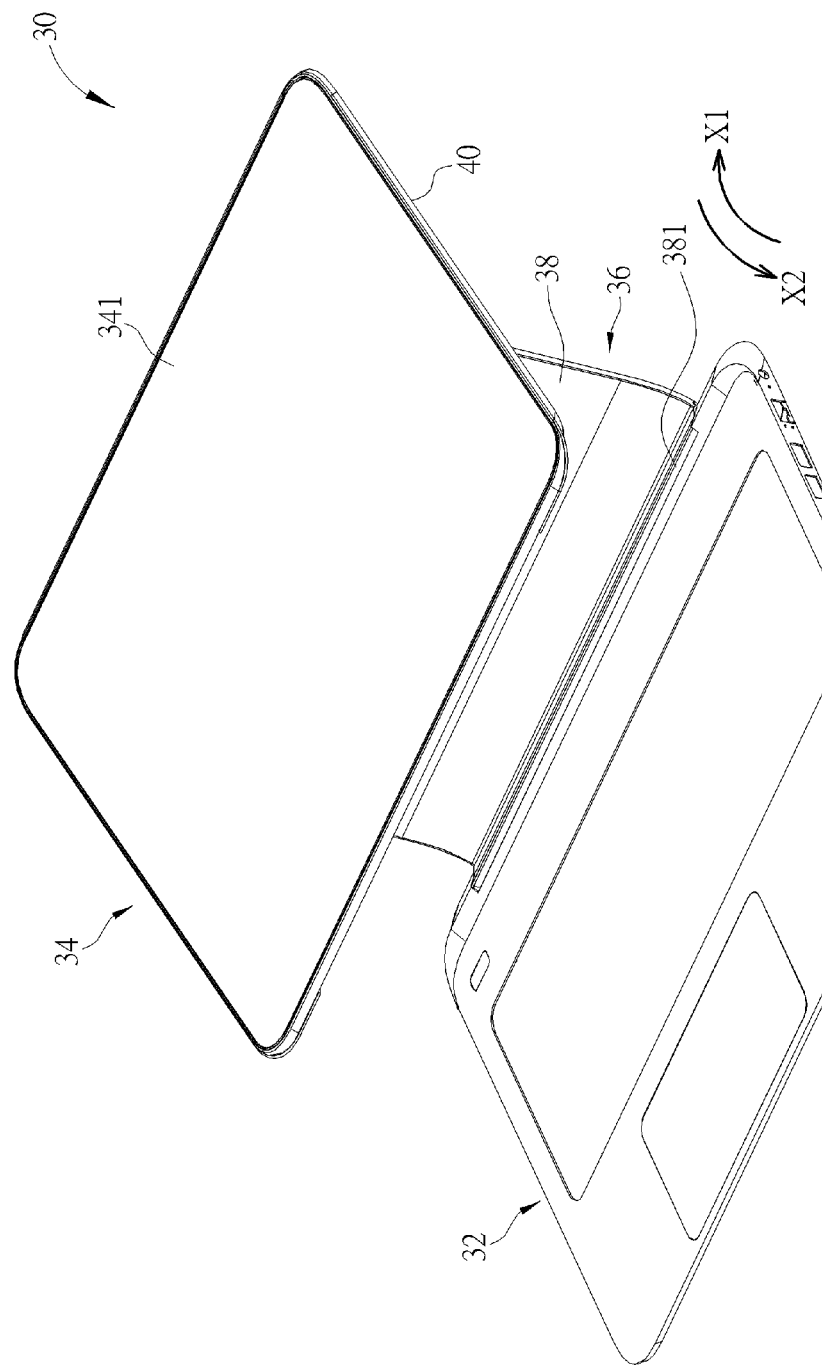
FIG. 4 to FIG. 6 are respectively diagrams of the electronic device in different statuses according to the embodiment of the present invention.
Figure 5:
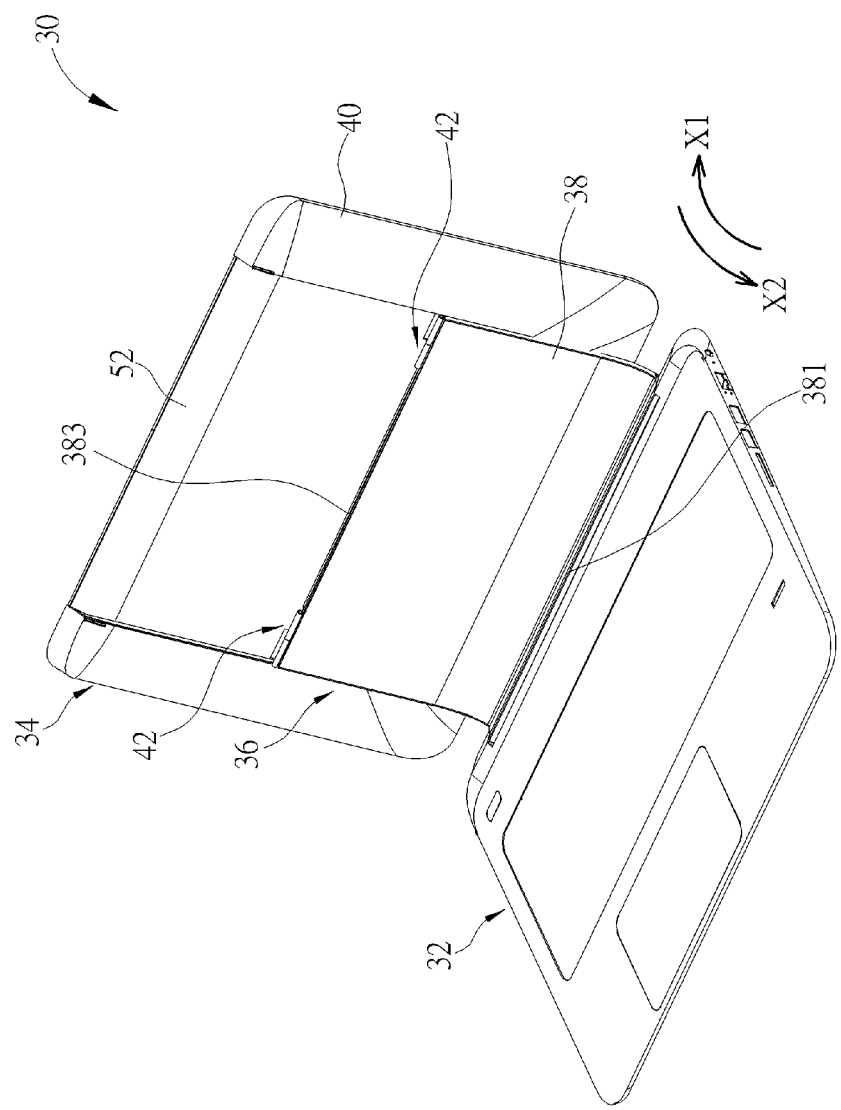
Figure 6:
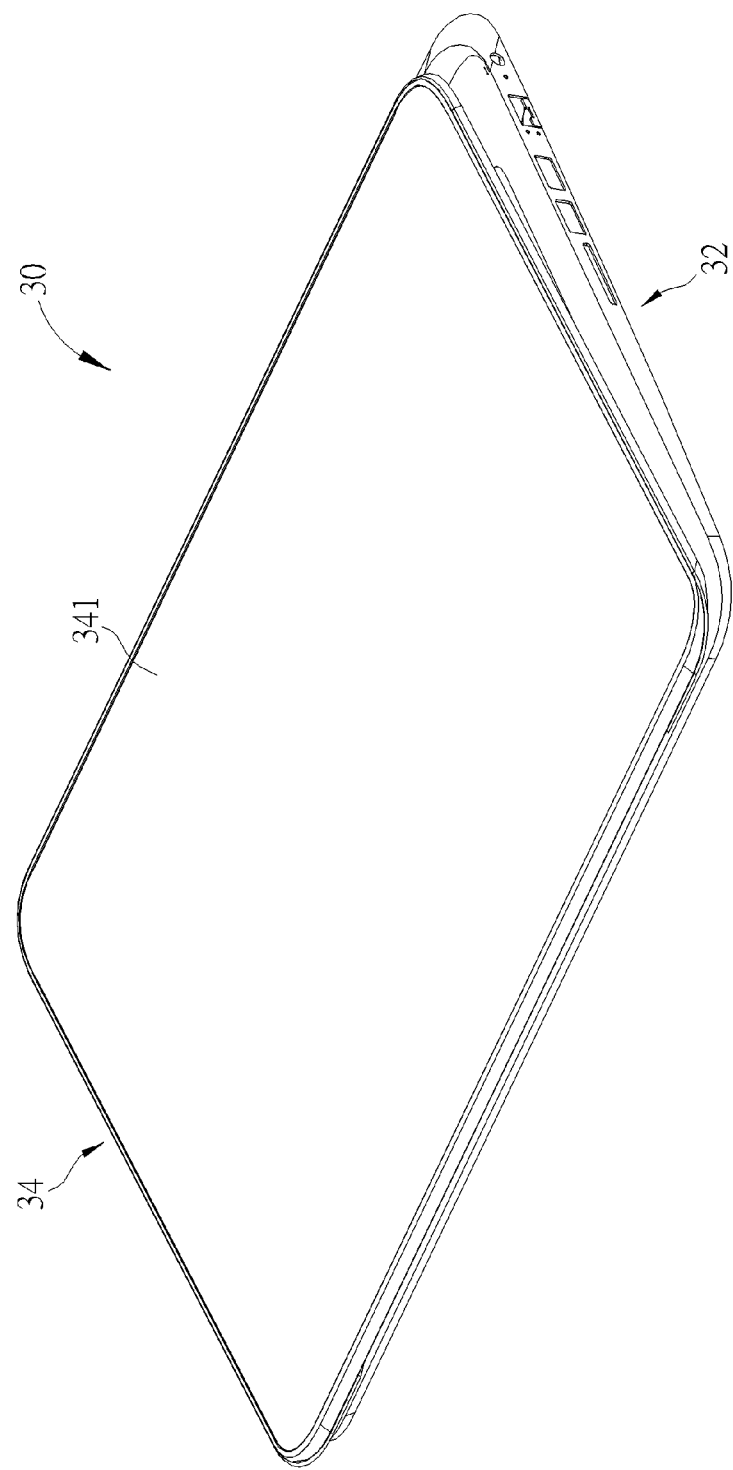

Please refer to FIG. 1 and FIG. 4 to FIG. 6. FIG. 4 to FIG. 6 are respectively diagrams of the electronic device 30 in different statuses according to the embodiment of the present invention. As shown in FIG. 1 and FIG. 4 to FIG. 6, when the electronic device 30 (i.e. the notebook computer) is desired to be in the tablet computer mode, the second module 34 (i.e. the display module) is rotated from the expanded position shown in FIG. 1 in the first direction X1. When the second module 34 (i.e. the display module) is located in the expanded position shown in FIG. 1, the first module 32 (i.e. the host module) stops the linkage member 36. Accordingly, the linkage member 36 is incapable of rotating in the first direction X1. Meanwhile, the second module 34 (i.e. the display module) is further capable of rotating about the second side 383 of the first casing 38 of the linkage member 36 in the first direction X1 by the hinge mechanism 42. In such a manner, the second module 34 (i.e the display module) is rotated from the expanded position shown in FIG. 1 to a position shown in FIG. 5 via a position shown in FIG. 4.

Afterwards, the second module 34 (i.e. the display module) and the linkage member 36 are rotated from the position shown in FIG. 5 to a position shown in FIG. 6 in the second direction X2. Meanwhile, the second module 34 (i.e. the display module) overlaps with and lies on the first module 32 (i.e. the host module), and the touch panel (i.e. the display panel 341) of the second module 34 (i.e. the display module) faces the user. Accordingly, the touch control operations can be performed on the touch panel (i.e. the display panel 341) of the display module (i.e. the second module 34). In summary, the electronic device 30 (i.e. the notebook computer) of the present invention provides the user with not only the notebook computer mode but also the tablet computer mode, so as to enhance flexibility of the electronic device 30 (i.e. the notebook computer) in use. Implementation of the hinge mechanism 42 of the present invention is not limited to those illustrated in figures in this embodiment. For example, the hinge mechanism 42 of the present invention can be implemented in a card case, i.e the hinge mechanism 42 can be used for pivoting an upper case and a lower case of the card case. As for which one of the above-mentioned designs is adopted, it depends on practical demands.

Figure 7:
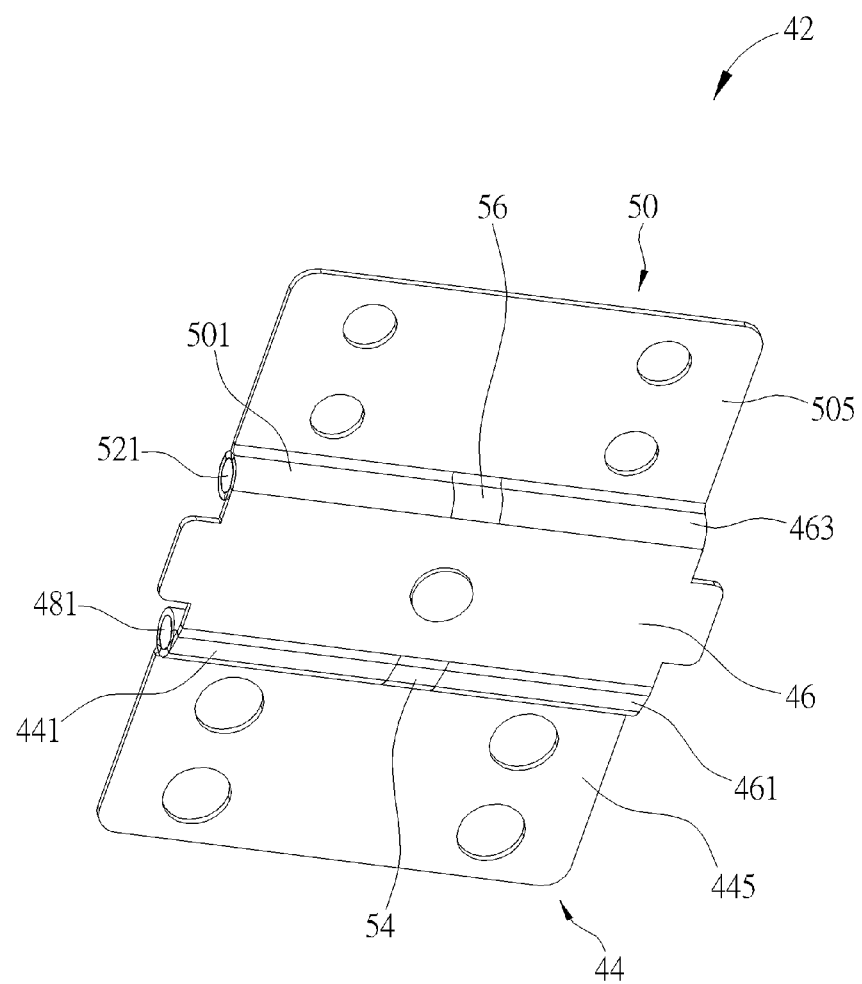
FIG. 7 is a diagram of a hinge mechanism according to the embodiment of the present invention.
Figure 8:
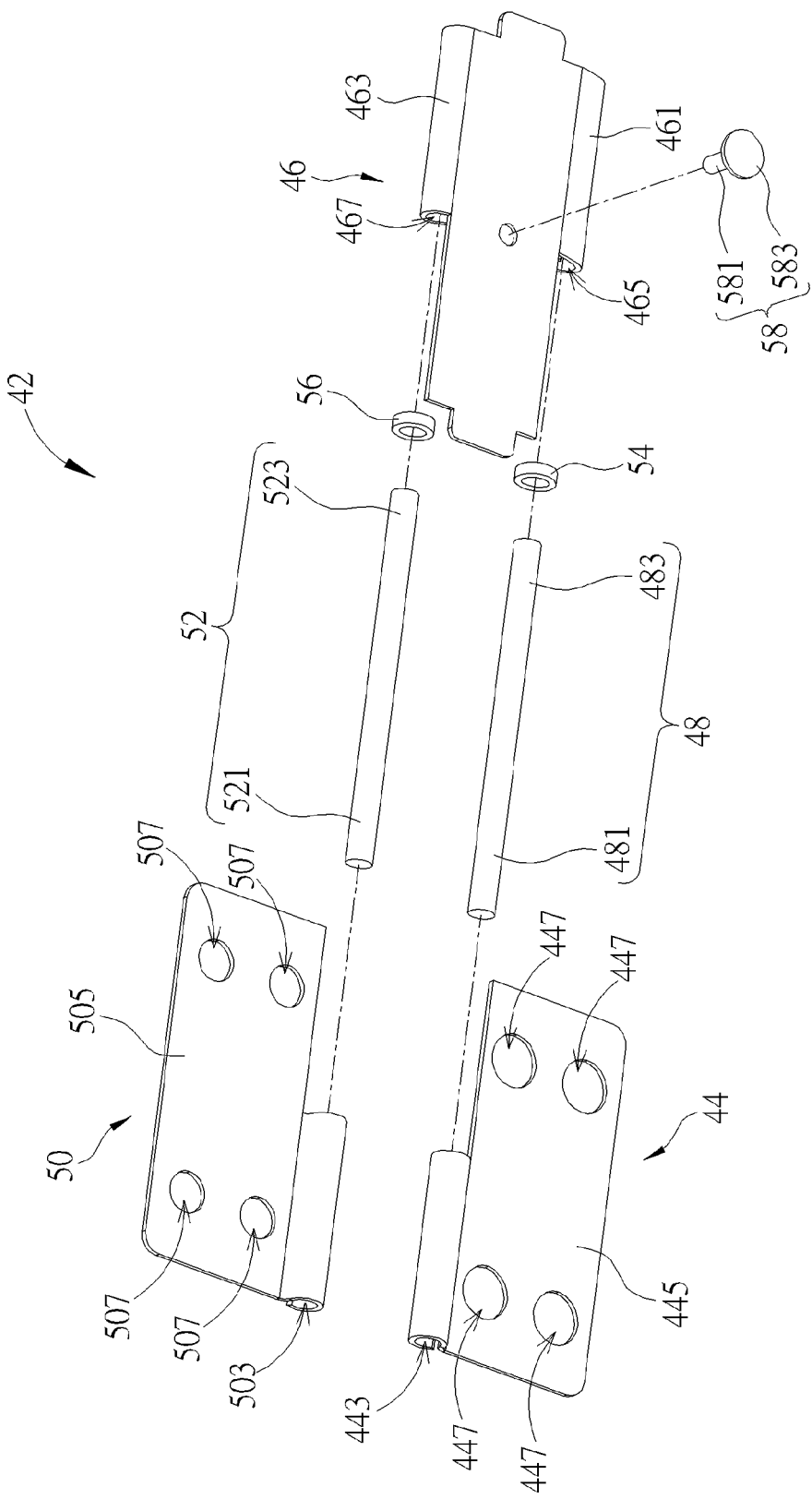
FIG. 8 is an exploded diagram of the hinge mechanism according to the embodiment of the present invention.

Please refer to FIG. 3, FIG. 7 and FIG. 8. FIG. 7 is a diagram of the hinge mechanism 42 according to the embodiment of the present invention. FIG. 8 is an exploded diagram of the hinge mechanism 42 according to the embodiment of the present invention. As shown in FIG. 3, FIG. 7 and FIG. 8, the hinge mechanism 42 includes a first bracket 44, a linking bracket 46 and a first rotating shaft 48. The first bracket 44 is fixed on the first casing 38 of the linkage member 36 and includes a first rotating portion 441. The linking bracket 46 includes a first pivotal portion 461, and the first rotating shaft 48 includes a first bracket shaft portion 481 and a first linking shaft portion 483 opposite to the first bracket shaft portion 481. In the process of assembling the first bracket 44 and the linking bracket 46, the first bracket shaft portion 481 of the first rotating shaft 48 is pivoted to the first rotating portion 441 of the first bracket 44, and the first linking shaft portion 483 of the first rotating shaft 48 is pivoted to the first pivotal portion 461 of the linking bracket 46. In such a manner, the linking bracket 46 is connected to the first bracket 44 by the first rotating shaft 48 in a rotable manner.

In addition, the hinge mechanism 42 further includes a second bracket 50 and a second rotating shaft 52. The second bracket 50 is fixed on the second casing 40 of the second module 34 and includes a second rotating portion 501. The linking bracket 46 further includes a second pivotal portion 463, and the second rotating shaft 52 includes a second bracket shaft portion 521 and a second linking shaft portion 523 opposite to the second bracket shaft portion 521. In the process of assembling the second bracket 50 and the linking bracket 46, the second bracket shaft portion 521 of the second rotating shaft 52 is pivoted to the second rotating portion 501 of the second bracket 50, and the second linking shaft portion 523 of the second rotating shaft 52 is pivoted to the second pivotal portion 463 of the linking bracket 46. In such a manner, the linking bracket 46 is connected to the second bracket 50 by the second rotating shaft 52 in a rotable manner.

As shown in FIG. 8, a first pivotal hole 443 is formed on the first rotating portion 441 of the first bracket 44, and the first pivotal hole 443 rotably sheathes the first bracket shaft portion 481 of the first rotating shaft 48, such that the first rotating portion 441 of the first bracket 44 is pivoted to the first bracket shaft portion 481 of the first rotating shaft 48. A first rotating hole 465 is formed on the first pivotal portion 461 of the linking bracket 46, and the first rotating hole 465 rotably sheathes the first linking shaft portion 483 of the first rotating shaft 48, such that the first pivotal portion 461 of the linking bracket 46 is pivoted to the first linking shaft portion 483 of the first rotating shaft 48. Since the first rotating portion 441 of the first bracket 44 is pivoted to the first bracket shaft portion 481 of the first rotating shaft 48, the first bracket 44 is rotable relative to the first rotating shaft 48. Since the first pivotal portion 461 of the linking bracket 46 is pivoted to the first linking shaft portion 483 of the first rotating shaft 48, the linking bracket 46 is rotable relative to the first rotating shaft 48. As a result, the first bracket 44 is rotable relative to the linking bracket 46 by the first rotating shaft 48.

As shown in FIG. 8, a second pivotal hole 503 is formed on the second rotating portion 501 of the second bracket 50, and the second pivotal hole 503 rotably sheathes the second bracket shaft portion 521 of the second rotating shaft 52, such that the second rotating portion 501 of the second bracket 50 is pivoted to the second bracket shaft portion 521 of the second rotating shaft 52. A second rotating hole 467 is formed on the second pivotal portion 463 of the linking bracket 46, and the second rotating hole 467 rotably sheathes the second linking shaft portion 523 of the second rotating shaft 52, such that the second pivotal portion 463 of the linking bracket 46 is pivoted to the second linking shaft portion 523 of the second rotating shaft 52. Since the second rotating portion 501 of the second bracket 50 is pivoted to the second bracket shaft portion 521 of the second rotating shaft 52, the second bracket 50 is rotable relative to the second rotating shaft 52. Since the second pivotal portion 463 of the linking bracket 46 is pivoted to the second linking shaft portion 523 of the second rotating shaft 52, the linking bracket 46 is rotable relative to the second rotating shaft 52. As a result, the second bracket 50 is rotable relative to the linking bracket 46 by the second rotating shaft 52.

Furthermore, the hinge mechanism 42 can further include a first bushing member 54 sheathing on the first rotating shaft 48, and two sides of the first bushing member 54 respectively abut against the first rotating portion 441 of the first bracket 44 and the first pivotal portion 461 of the linking bracket 46. The first bushing member 54 is used for separating the first rotating portion 441 of the first bracket 44 from the first pivotal portion 461 of the linking bracket 46. When the first bracket 44 rotates relative to the linking bracket 46, the first bushing member 54 prevents the first rotating portion 441 of the first bracket 44 from rubbing against the first pivotal portion 461 of the linking bracket 46, so as to prevent abrasions of the first rotating portion 441 and the first pivotal portion 461. In summary, the first bushing member 54 can be used for enhancing life of the hinge mechanism 42.

Furthermore, the hinge mechanism 42 can further include a second bushing member 56 sheathing on the second rotating shaft 52, and two sides of the second bushing member 56 respectively abut against the second rotating portion 501 of the second bracket 50 and the second pivotal portion 463 of the linking bracket 46. The second bushing member 56 is used for separating the second rotating portion 501 of the second bracket 50 from the second pivotal portion 463 of the linking bracket 46. When the second bracket 50 rotates relative to the linking bracket 46, the second bushing member 56 prevents the second rotating portion 501 of the second bracket 50 from rubbing against the second pivotal portion 463 of the linking bracket 46, so as to prevent abrasions of the second rotating portion 501 and the second pivotal portion 463. In summary, the second bushing member 56 can be used for enhancing life of the hinge mechanism 42.

As shown in FIG. 3, FIG. 7 and FIG. 8, the first bracket 44 of the hinge mechanism 42 further includes a first fixing portion 445 for being fixed on the first casing 38 of the linkage member 36, such that the first bracket 44 is fixed on the first casing 38. In addition, the second bracket 50 of the hinge mechanism 42 further includes a second fixing portion 505 for being fixed on the second casing 40 of the second module 34, such that the second bracket 50 is fixed on the second casing 40. In this embodiment, four first through holes 447 are formed on the first fixing portion 445, and four second through holes 507 are formed on the second fixing portion 505, as shown in FIG. 8. The first through holes 447 and the second through holes 507 allow screws to pass through. In such a manner, the screws are capable of screwing on the first casing 38 and the second casing 40 after passing through the first through holes 447 and the second through holes 507, such that the first fixing portion 445 and the second fixing portion 505 are respectively fixed on the first casing 38 and the second casing 40.

Amounts of the first through hole 447 and the second through hole 507 are not limited to those illustrated in figures in this embodiment. For example, there can be only one first through hole 447 formed on the first fixing portion 445 and only one second through hole 507 formed on the second fixing portion 505 as well. In other words, structures that at least one first through hole 447 is formed on the first fixing portion 445 and at least one second through hole 507 is formed on the second fixing portion 505 are within the scope of the present invention. In summary, the first fixing portion 445 and the second fixing portion 505 are respectively fixed on the first casing 38 and the second casing 40 in a screwed manner. Structures of the first fixing portion 445 and the second fixing portion 505 are not limited to those illustrated in figures in this embodiment. For example, the first fixing portion 445 and the second fixing portion 505 can be respectively a hook structure respectively fixed on the first casing 38 and the second casing 40 in a hooking manner. As for which one of the above-mentioned designs is adopted, it depends on practical demands.

It should be noticed that the second casing 40 of the second module 34 can include a covering member 60 for covering the second bracket 50 of the hinge mechanism 42. Accordingly, when the second module 34 is in the expanded position shown in FIG. 2, the covering member 60 covers the hinge mechanism 42, such that the hinge mechanism 42 is not exposed, and thus it keeps unity of the appearance of the second module 34. In this embodiment, the covering member 60 is installed on the second casing 40 in a hooking manner, but structures of the covering member 60 and the second casing 40 are not limited to those illustrated in figures in this embodiment. For example, the covering member 60 and the second casing 40 can be integrally formed as well. As for which one of the above-mentioned designs is adopted, it depends on practical demands.

Figure 9:
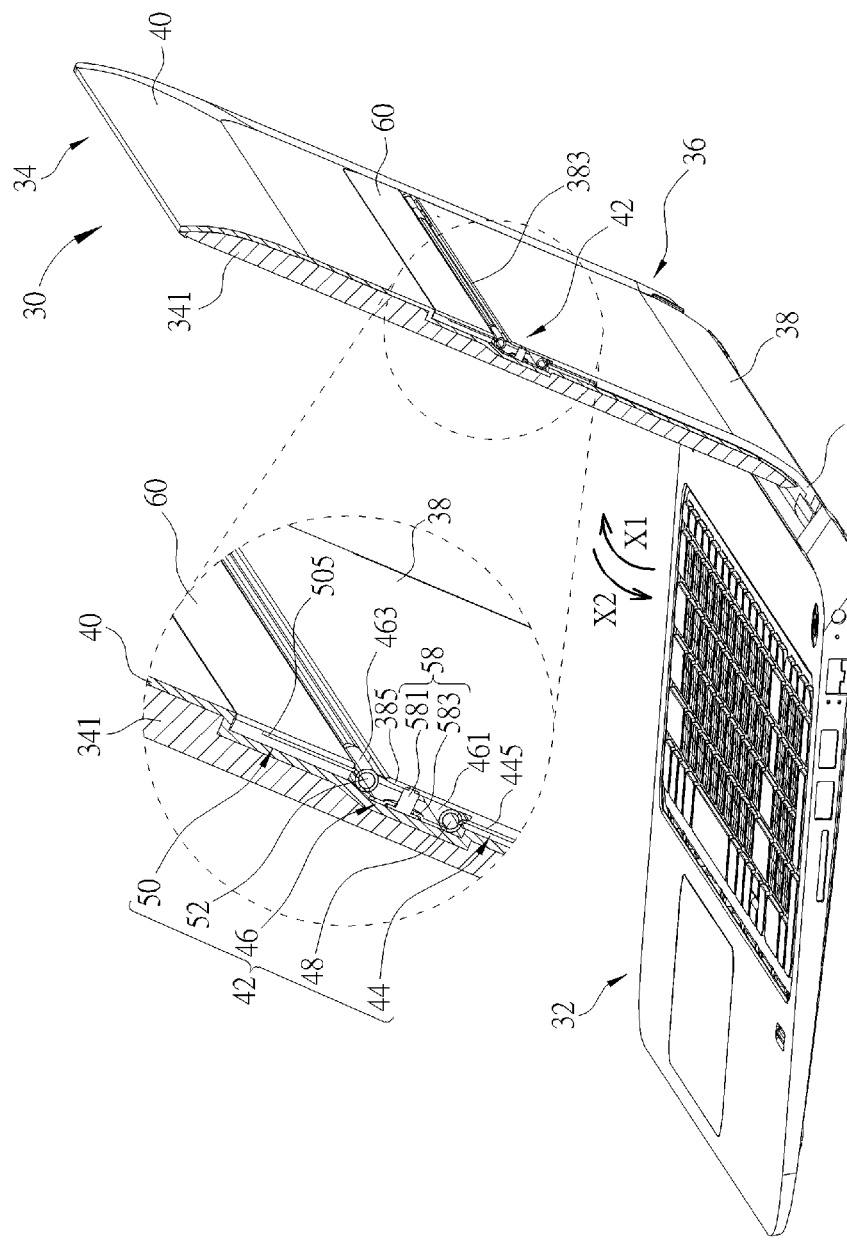
FIG. 9 is a partly sectional diagram of the electronic device in the expanded status according to the embodiment of the present invention.

Please refer to FIG. 8 and FIG. 9. FIG. 9 is a partly sectional diagram of the electronic device 30 in the expanded status according to the embodiment of the present invention. As shown in FIG. 8 and FIG. 9, the hinge mechanism 42 of the electronic device 30 can further include a stopping component 58 movably disposed through the linking bracket 46 and fixed on the first casing 38 of the linkage member 36. When the electronic device 30 is in the expanded status, the stopping component 58 is used for stopping the linking bracket 46 in the expanded position, as shown in FIG. 9. In this embodiment, the stopping component 58 is a screw component and includes a thread portion 581 and a head portion 583. The thread portion 581 is movably disposed through the linking bracket 46 and for screwing on the first casing 38 of the linkage member 36, such that the screw component (i.e. the stopping component 58) is fixed on the first casing 38. The head portion 583 is connected to the thread portion 581 and for stopping the linking bracket 46 in the expanding position, as shown in FIG. 9. Structures of the stopping component 58 are not limited to those illustrated in figures in this embodiment, and it depends on practical demands.

More detailed descriptions for principles of the hinge mechanism 42 are provided as follows. Please refer to FIG. 9 to FIG. 13. FIG. 10 to FIG. 13 are respectively partly sectional diagrams of the electronic device 30 in different statuses according to the embodiment of the present invention. As shown in FIG. 9 to FIG. 13, when the electronic device 30 is desired to be operated in the tablet computer mode, the second module 34 is rotated in the first direction X1 from the position shown in FIG. 9. As mentioned above, in the process of rotation, the linkage member 36 is stopped rotating in the first direction X1 by the first module 32. Meanwhile, the second module 34 and the second casing 40 thereof utilize the hinge mechanism 42 to rotate relative to the first casing 38 of the linkage member 36 in the first direction X1.

Furthermore, in the process that the second casing 40 of the second module 34 rotates relative to the first casing 38 of the linkage member 36 in the first direction X1, the second casing 40 activates the second bracket 50 to drive the linking bracket 46 to rotate relative to the first bracket 44 in the first direction X1 by the first rotating shaft 48. Afterwards, when the second module 34 rotates from the expanded position shown in FIG. 9 to a position shown in FIG. 10, a stopping portion 385 of the first casing 38 of the linkage member 36 stops the linking bracket 46. For example, when the second casing 40 of the second module 34 rotates relative to the first casing 38 of the linkage member 36 to an angle, the stopping portion 385 of the first casing 38 is capable of stopping the linking bracket 46. Practically, the angle can be designed as 15 degrees. Furthermore, when the second casing 40 of the second module 34 rotates relative to the first casing 38 of the linkage member 36 in the first direction X1 over the angle, the linking bracket 46 is stopped rotating in the first direction X1 by the stopping portion 385 of the first casing 38. Accordingly, the second casing 40 of the second module 34 cooperates with the stopping portion 385 of the first casing 38 for forcing the linking bracket 46 to bend, such that the second rotating shaft 52 of the hinge mechanism 42 is displaced and moved out of the first casing 38 of the linkage member 36, as shown in FIG. 10.

Figure 10:
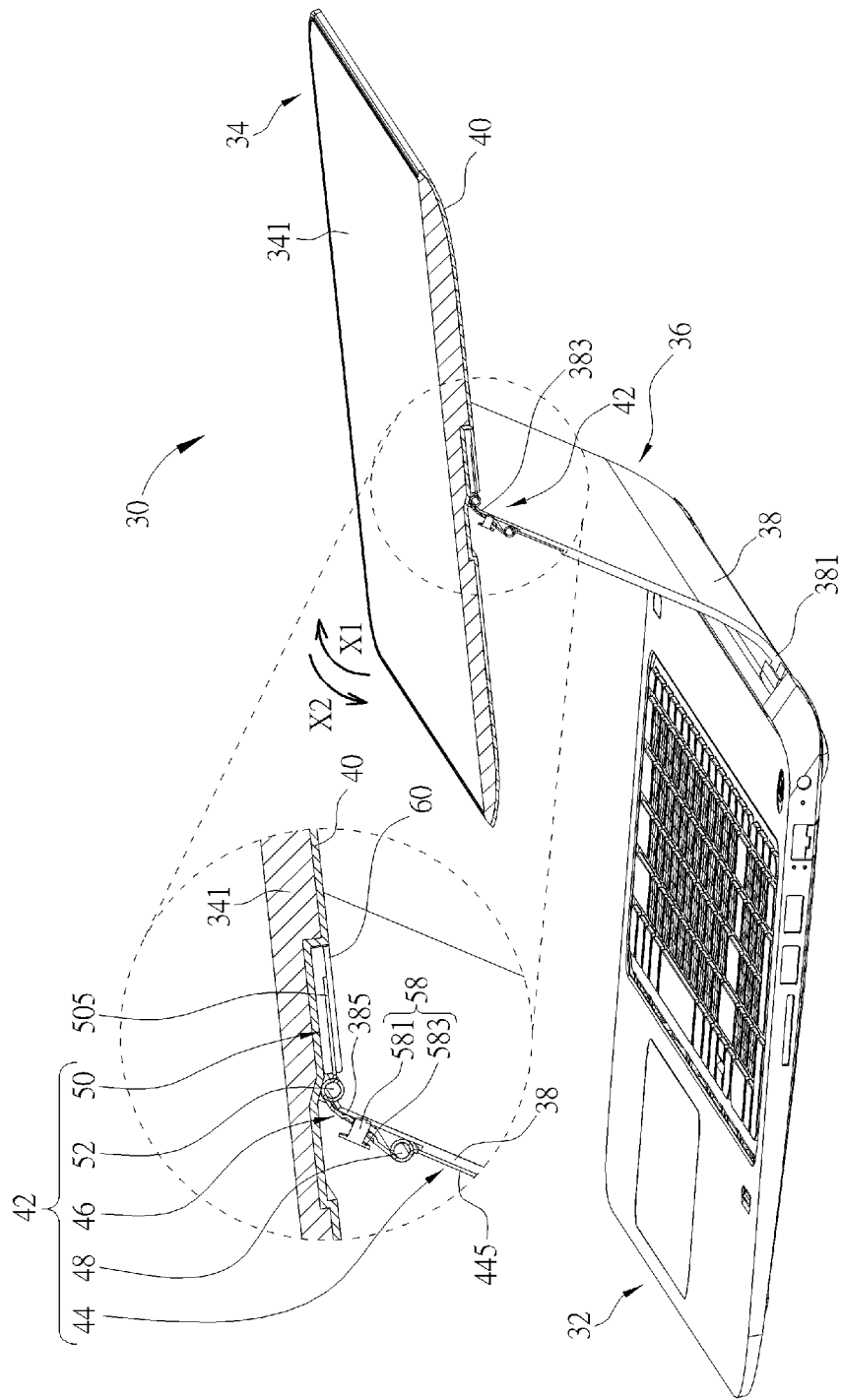
FIG. 10 to FIG. 13 are respectively partly sectional diagrams of the electronic device in different statuses according to the embodiment of the present invention.
Figure 11:
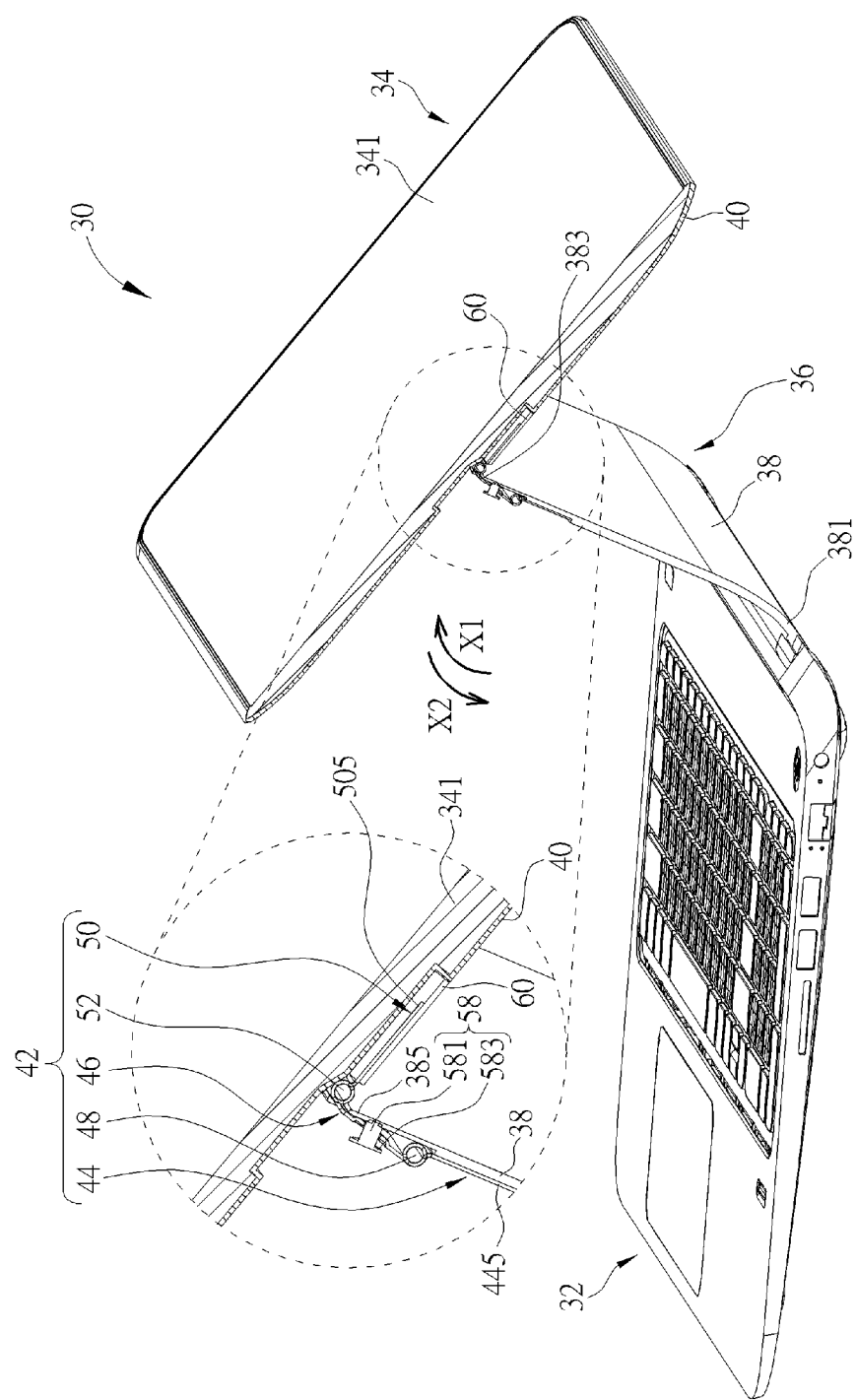
Figure 12:
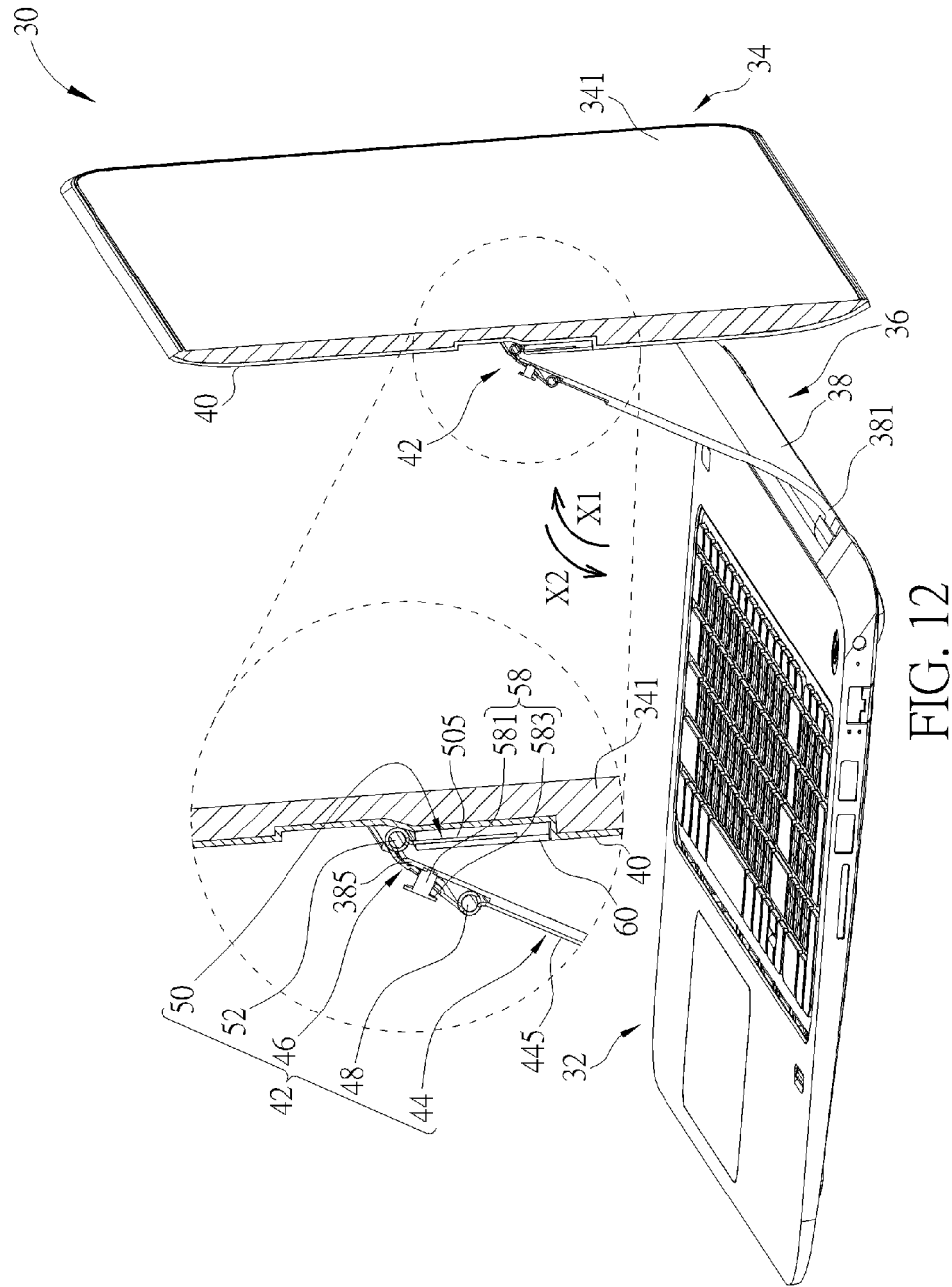
Figure 13:
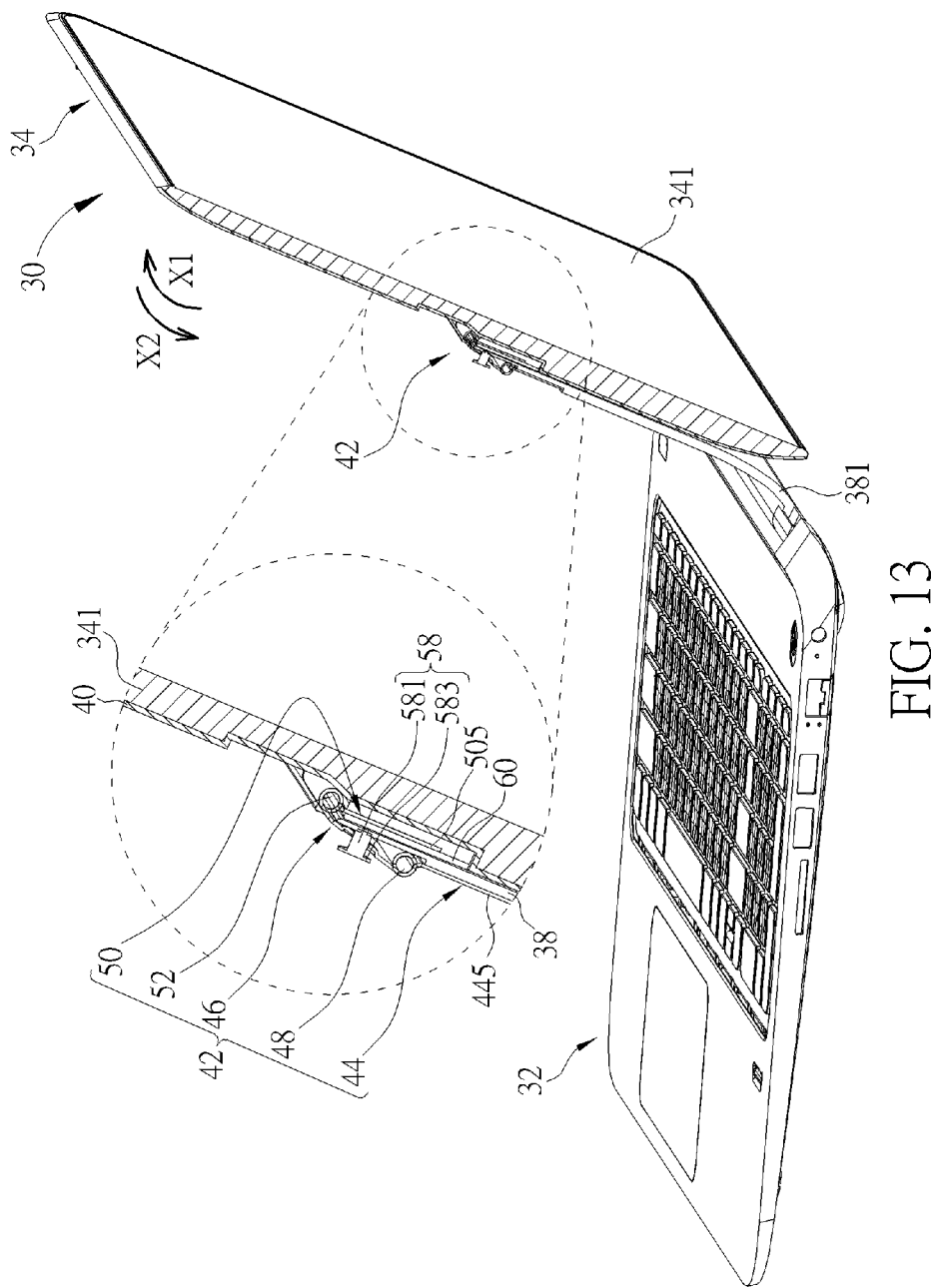

When the second casing 40 of the second module 34 rotates relative to the first casing 38 of the linkage member 36 over the angle and the second rotating shaft 52 of the hinge mechanism 42 is displaced and moved out of the first casing 38 of the linkage member 36, the second bracket 50 of the hinge mechanism 42 rotates about the second rotating shaft 52 and relative to the linking bracket 46, such that the second module 34 and the second casing 40 thereof rotate from the position shown in FIG. 10 to a position shown in FIG. 11. In such a manner, the second module 34 can rotate from the position shown in FIG. 11 to a position shown in FIG. 13 via a position shown in FIG. 12. When the second module 34 is in the position shown in FIG. 13, the second casing 40 of the second module 34 overlaps with and lies on the first casing 38 of the linkage member 36. As shown in FIG. 6 and FIG. 13, the second module 34 and the linkage member 36 are rotated relative to the first module 32 in the second direction X2 from the position shown in FIG. 13 to the position shown in FIG. 6, and then the second module 34 overlaps with and lies on the first module 32 for the user to perform the touch control operations on the display panel 341 of the second module 34.

Compared to the prior art, the hinge mechanism of the present invention utilizes the linking bracket to displace the second rotating shaft relative to the first rotating shaft, so as to move the second rotating shaft out of the first casing of the linkage member. Furthermore, the second module is capable of rotating about the second rotating shaft of the hinge mechanism to the position that the second casing of the second module overlaps with and lies on the first casing of the linkage member. In the above process that the second module rotates relative to and overlaps with the linkage member, the first casing of the linkage member does not interfere with the second casing of the second module since the two rotating shafts of the hinge mechanism of the present invention have two-step rotation design. As a result, it does not need to form a recess on the second casing of the second module. Thus, it improves an appearance issue of electronic device resulting from the recess and advantages the electronic device in the market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge mechanism with multiple rotating axes, comprising:
a first bracket comprising a first rotating portion;
a linking bracket comprising a first pivotal portion and a second pivotal portion;
a first rotating shaft comprising a first bracket shaft portion and a first linking shaft portion opposite to the first bracket shaft portion, the first bracket shaft portion being rotatably connected to the first rotating portion and the first linking shaft portion being rotatably connected to the first pivotal portion, such that the linking bracket is connected to the first bracket in a rotable manner;
a second bracket comprising a second rotating portion;
a second rotating shaft comprising a second bracket shaft portion and a second linking shaft portion opposite to the second bracket shaft portion, the second bracket shaft portion being rotatably connected to the second rotating portion and the second linking shaft portion being rotatably connected to the second pivotal portion, such that the linking bracket is further connected to the second bracket in a rotable manner; and
a stopping component movably disposed through the linking bracket and fixed on the first casing, the stopping component being for stopping the linking bracket in an expanded position.

2. The hinge mechanism of claim 1, wherein the first bracket further comprises a first fixing portion for being fixed on a first casing, the second bracket further comprises a second fixing portion for being fixed on a second casing, and the second casing activates the second bracket as rotating relative to the first casing, such that the second bracket drives the linking bracket to rotate about the first rotating shaft and relative to the first bracket.

3. The hinge mechanism of claim 2, wherein a stopping portion of the first casing stops the linking bracket when the second casing rotates relative to the first casing over an angle for forcing the linking bracket to bend, such that the second rotating shaft is displaced and moved.

4. The hinge mechanism of claim 3, wherein the second casing activates the second bracket to rotate about the second rotating shaft and relative to the linking bracket when the second casing rotates relative to the first casing over the angle and the second rotating shaft is displaced and moved.

5. The hinge mechanism of claim 1, further comprising:
a first bushing member sheathing on the first rotating shaft, two sides of the first bushing member respectively abutting against the first rotating portion of the first bracket and the first pivotal portion of the linking bracket.

6. The hinge mechanism of claim 5, further comprising:
a second bushing member sheathing on the second rotating shaft, two sides of the second bushing member respectively abutting against the second rotating portion of the second bracket and the second pivotal portion of the linking bracket.

7. The hinge mechanism of claim 1, further comprising:
a first bushing member sheathing on the first rotating shaft, two sides of the first bushing member respectively abutting against the first rotating portion of the first bracket and the first pivotal portion of the linking bracket; and
a second bushing member sheathing on the second rotating shaft, two sides of the second bushing member respectively abutting against the second rotating portion of the second bracket and the second pivotal portion of the linking bracket.

8. The hinge mechanism of claim 1, wherein the stopping component is a screw component and comprises:
a thread portion movably disposed through the linking bracket and for screwing on the first casing; and
a head portion connected to the thread portion and for stopping the linking bracket in the expanding position.

9. An electronic device, comprising:
a linkage member comprising a first casing;
a first module rotatably connected to a first side of the first casing;
a second module comprising a second casing; and
a hinge mechanism installed on a second side of the first casing relative to the first side and for pivoting the linkage member and the second module, the hinge mechanism comprising:
a first bracket fixed on the first casing and comprising a first rotating portion;
a linking bracket comprising a first pivotal portion and a second pivotal portion;

a first rotating shaft comprising a first bracket shaft portion and a first linking shaft portion opposite to the first bracket shaft portion, the first bracket shaft portion being rotatably connected to the first rotating portion and the first linking shaft portion being rotatably connected to the first pivotal portion, such that the linking bracket is connected to the first bracket in a rotable manner;

a second bracket fixed on the second casing and comprising a second rotating portion; and a second rotating shaft comprising a second bracket shaft portion and a second linking shaft portion opposite to the second bracket shaft portion, the second bracket shaft portion being rotatably connected to the second rotating portion and the second linking shaft portion being rotatably connected to the second pivotal portion, such that the linking bracket is further connected to the second bracket in a rotable manner.

10. The electronic device of claim 9, wherein the first bracket further comprises a first fixing portion for being fixed on the first casing, the second bracket further comprises a second fixing portion for being fixed on the second casing, and the second casing activates the second bracket as rotating relative to the first casing, such that the second bracket drives the linking bracket to rotate about the first rotating shaft and relative to the first bracket.

11. The electronic device of claim 10, wherein the first casing comprises a stopping portion stopping the linking bracket when the second casing rotates relative to the first casing over an angle for forcing the linking bracket to bend, such that the second rotating shaft is displaced and moved.

12. The electronic device of claim 11, wherein the second casing activates the second bracket to rotate about the second rotating shaft and relative to the linking bracket when the second casing rotates relative to the first casing over the angle and the second rotating shaft is displaced and moved.

13. The electronic device of claim 10, wherein the hinge mechanism further comprises:

a stopping component movably disposed through the linking bracket and fixed on the first casing, the stopping component being for stopping the linking bracket in an expanded position.

14. The electronic device of claim 13, wherein the hinge mechanism further comprises:

a first bushing member sheathing on the first rotating shaft, two sides of the first bushing member respectively abutting against the first rotating portion of the first bracket and the first pivotal portion of the linking bracket.

15. The electronic device of claim 14, wherein the hinge mechanism further comprises:

a second bushing member sheathing on the second rotating shaft, two sides of the second bushing member respectively abutting against the second rotating portion of the second bracket and the second pivotal portion of the linking bracket.

16. The electronic device of claim 9, wherein the hinge mechanism further comprises:

a stopping component movably disposed through the linking bracket and fixed on the first casing, the stopping component being for stopping the linking bracket in an expanded position.

17. The electronic device of claim 16, wherein the hinge mechanism further comprises:

a first bushing member sheathing on the first rotating shaft, two sides of the first bushing member respectively abutting against the first rotating portion of the first bracket and the first pivotal portion of the linking bracket; and a second bushing member sheathing on the second rotating shaft, two sides of the second bushing member respectively abutting against the second rotating portion of the second bracket and the second pivotal portion of the linking bracket.

18. The electronic device of claim 16, wherein the stopping component is a screw component and comprises:

a thread portion movably disposed through the linking bracket and for screwing on the first casing; and a head portion connected to the thread portion and for stopping the linking bracket in the expanding position.

* * * * *